May 25, 1965 E. B. ROGERS 3,184,967
ELECTRIC CHARGE FLOW METER
Filed Nov. 14, 1962
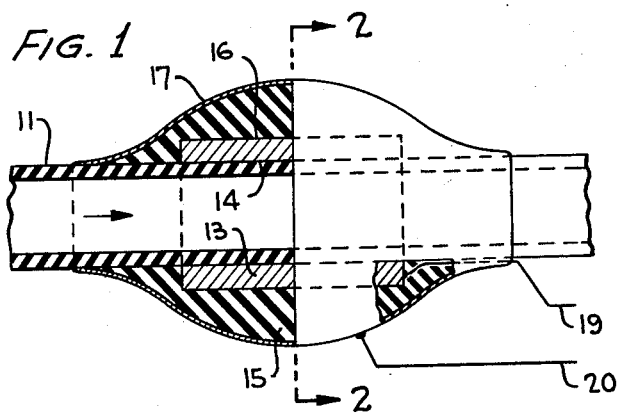
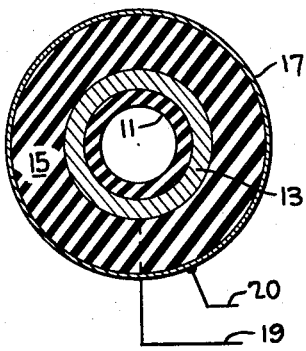
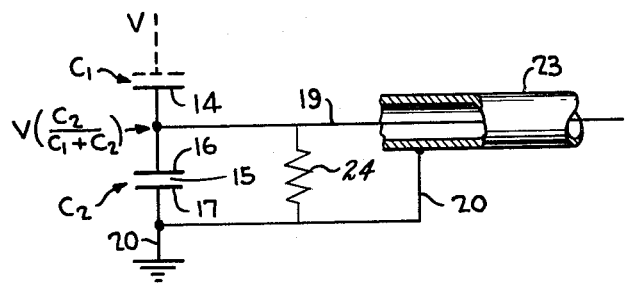
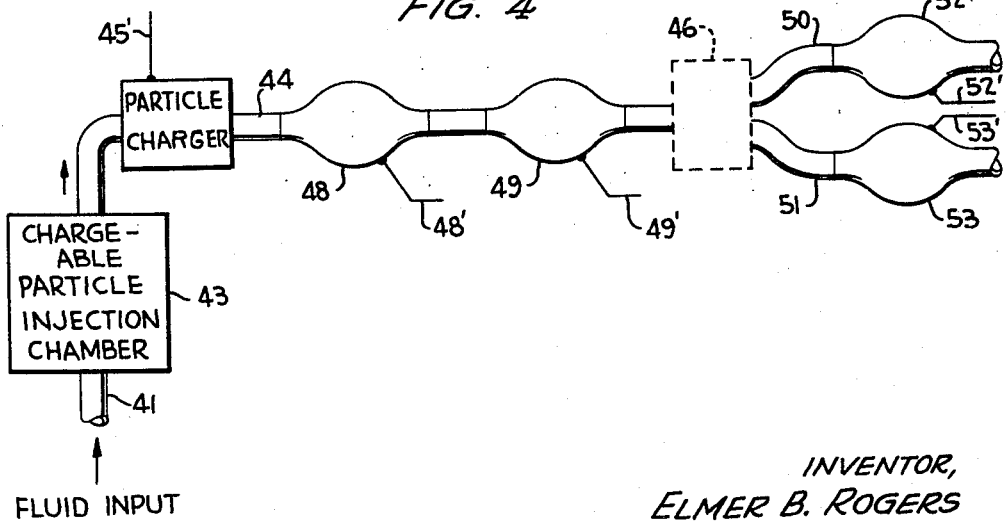
INVENTOR,
ELMER B. ROGERS 3,184,967
ELECTRIC CHARGE FLOW METER
Elmer B. Rogers, Washington, D.C., assignor to the United States of America as represented by the Secretary of the Army
Filed Nov. 14, 1962, Ser. No. 237,772
2 Claims. (Cl. 73—194)
(Granted under Title 35, U.S. Code (1952), sec. 266)

The invention described herein may be manufactured and used by or for the Government of the United States of America for governmental purposes without the payment to me of any royalty thereon.

This invention relates to fluid flow meters and more particularly to meters responsive to the electric charge contained in a fluid.

Devices capable of measuring the volume or mass flow rates of fluids flowing through pipe lines are not new. Most such devices must be inserted directly inside the pipe since they are mechanically or thermally actuated. One class of devices, represented by rotating-vaneanemometers and piston meters, function very well when used to measure large volume, low velocity flows where there are no sudden changes in velocity. A second class of flow meters operate by measuring the pressure differential produced by the flow across a nozzle or an orifice. The measurement of differential pressure is accomplished by means of a pair of pressure responsive elements inserted in the pipe, one upstream and the other downstream from the nozzle. The differential pressure reading obtained is then translated into a velocity reading by the use of a standard flow equation which, for a given measuring system, pipe line and fluid, establishes a definite relationship between differential pressure and rate of flow. Devices of this type are very useful for many applications where the rate of flow is high but the variations in that flow rate are not rapid.

Both of the above-mentioned types of devices are unsuitable for measuring flows through very small pipe lines since their presence in such pipe lines produces a relatively high degree of turbulence in the fluid. Further, these devices are inadequate when the fluid undergoes rapid changes in flow rate.

It is therefore an object of this invention to provide means for measuring the velocities and acceleration of fluid flows in very small diameter conduits without introducing turbulence into that flow.

It is another object of this invention to impress on a fluid flow, and to detect therein, an identifiable signal, without introducing turbulence into said fluid flow.

It is still another object of this invention to detect and obtain measurement of the velocity and acceleration of flow of a fluid by means of electrostatic induction techniques.

These and other objects will become more readily understood by reference to the following description and the accompanying drawings in which:

FIG. 1 is a sectional view of a measuring element constructed according to the present invention, along with an illustrative pipe line system.

FIG. 2 is a cross-sectional end view of the device of FIG. 1.

FIG. 3 is an electrical schematic representation of the device of FIG. 1.

FIG. 4 is a pictorial illustration of a measuring system according to the present invention.

Briefly stated, the practice of my invention involves the introduction of a small quantity of an additive into a fluid stream. The additive contains particles that are inherently electrically charged or that become electrically charged when moving in a fluid stream. Talcum powder is one example of the latter type of additive and is one which has been successfully used in the practice of this invention. This additive can be continuously introduced into the stream at a constant rate so as to give the stream a uniform electrical charge density, or it can be introduced in pulses, or it can be introduced in some arbitrarily varied manner so as to give a particular portion of the fluid stream a "signature." Conversley, a fluid stream containing charged particles can be deionized, by irradiation or other means, to obtain a change in charge to serve as a discrete signal. It should be understood that this system is operable with either gas or liquid flow devices, and the use of the word "fluid" in this disclosure is intended to cover both liquids and gasses.

The remainder of the present system is comprised of a plurality of novel electrostatic induction measuring devices which can be placed at various points downstream from the point where the change in the particle electric charge is introduced into the fluid stream.

As has been previously suggested, the main purpose of the present invention is to overcome certain limitations in prior art fluid flow measuring devices for systems having small diameter conduits. The present invention is particularly useful in systems where the fluid flows are used as portions of control systems or data conversion systems rather than in mere fluid conveyor systems.

Systems using fluids as information carrying media have found increasing utility in recent times. Such systems utilize devices which perform operations analogous to those performed by such electronic circuits as amplifiers, oscillators, modulators, and logical circuit elements. Systems utilizing such devices are thought to be particularly useful as process control servomechanisms. However, the uses for such devices have only begun to be explored and the possibility exists that many diverse uses will be found for such devices. Particular consideration has been given to the employment of these devices in digital computer circuits. These circuits have the desirable properties of extreme reliability, no maintenance and insensitivity to nearby electromagnetic radiation. Such fluid systems are disclosed in Warren Patents 3,001,698 and 3,016,066, Horton Patent 3,024,805, and Woodward Patent 3,053,876.

It is in systems of this type that the high frequency response characteristics of this invention become particularly desirable. Furthermore, the fact that my measuring system does not produce any turbulence in the stream is another considerable advantage.

A specific embodiment of a measuring device constructed according to this invention is shown in FIG. 1 which shows a longitudinal section of a conduit 11, along with a measuring device. The element 13 represents a band of conducting metal which completely surrounds the conduit 11, and contacts the outer wall thereof. The material 15 is a dielectric which completely surrounds the outer surface of band 13. The dielectric 15 is in turn completely surrounded by a conducting sheet 17, which sheet is also known as a Faraday cage. This outer sheet 17 serves to electrically shield the band 13 from external electric fields and to create a capacitance between the band 13 and the sheet 17. Two leads, 19 and 20, are electrically connected to the measuring device, with the lead 19 being connected to the band 13 and the lead 20 being connected to the sheet 17. These two leads could consist of two separate wires or could consist of a single shielded wire with the wire portion attached to the plate 13 and the shielding, constituting the lead 20, being connected to the sheet 17. In the embodiment shown in FIG. 1, as well as in all other embodiments shown in this disclosure, the conduit 11 will be made of an electrically non-conducting material.

FIG. 2 is a cross-sectional view taken along the line 2—2 of FIG. 1. This figure illustrates the concentric manner in which this measuring unit is constructed.

If a fluid stream having a group of electrically charged particles dispersed through it were to flow through the conduit 11 and past the band 13, it is obvious that an electric charge of opposite polarity would be induced on the inner cylindrical surface of the band, thus causing an electric charge having the same polarity as that of the charges on the particles to concentrate on the band's outer cylindrical surface. Clearly, any one charged particle moving through conduit 11 would induce a charge on the band 13 during the interval when it is between the ends of that band. Therefore, the magnitude of the charge induced on the inner surface of the band 13 will be directly dependent on the concentration of the charge in the fluid stream, and not on the speed with which the stream is moving.

The electrical induction caused by the charged particles moving in the fluid stream causes the combination of the charged particles and the inner surface 14 of the band 13 to exhibit the behavior of a capacitor in series with a source of D.-C. voltage. Since the band 13 completely surrounds a segment of the stream of particles and since the particles are normally randomly distributed through the fluid stream, it is not surprising that it has been experimentally determined that the charge induced on the surface 14 of the band 13 is directly proportional to the concentration of charge in that segment of the stream.

If the wire 19 is not connected to ground the band 13 is electrically isolated so that each charge induced on its inner surface 14 will cause an equal and opposite charge to be induced on the outer surface 16. These latter charges will in turn induce charges on the outer shield 17 which have the same polarity as those appearing on the inner surface 14. Thus, the outer surface 16 of band 13, the dielectric material 15 and the shield 17 comprise a second capacitor. Furthermore, since the surfaces 14 and 16 are conductively connected by the body of band 13, this latter capacitor appears to be connected in series with the previously-described apparent capacitor. Because the amplitude of charge induced on the surface 16 is equal to that induced on surface 14 and, in turn the amplitude of charge on shield 17 equals that on surface 16, the voltage across the capacitor made up of elements 15, 16 and 17 will be directly proportional to the charge originally induced on the inner surface 14 of the band 13. This result necessarily follows from the fact that the voltage across any capacitor is represented by the equation $$v = \frac{q}{c}$$

where $q$ is the charge between the plates of the capacitor and $C$ is the capacitance thereof. One of the advantages of this dependence of the capacitor voltage on the fluid charge density is that when the charge density is unvarying and when the resistance between leads 19 and 20 is infinite, the voltage across that capacitance will be constant and will not decay with time. If some finite resistance 24 were inserted between these output leads, a very different result would be produced. The current path provided by such a resistance would prevent charge from being stored for any length of time on the capacitor $C_2$ of FIG. 3. (FIG. 3 is further discussed below.) In fact, if such a resistance had a sufficiently low value, the voltage thereacross would represent, to a very close approximation, the time derivative of the charge appearing at the outer surface of band 13. Such a voltage waveform can prove to be of great value when it is desired to determine the exact instant when a charge pulse in the fluid stream is at a particular position. Such a charge pulse is characterized by a small amount of dispersion of charged particles at its leading and trailing edges and a maximum charge density at its center. This means that as the pulse traverses one of the bands 13, it produces a charge-versus-time wave form in the general shape of a sinusoidal, half-wave pulse. Although the exact position of the center of this pulse would be difficult to determine by the techniques which merely record instantaneous charge density, the use of the above-noted differentiator would produce a signal which exhibits a zero cross-over when the center of the pulse is midway between the ends of band 13. Clearly, such a cross-over would be much easier to observe than would be the peak of the charge-density curve.

The electrical equivalent of the device shown in FIG. 1 is indicated in FIG. 3 wherein like reference numerals represent similar portions of the device of FIG. 1. The dotted portion of the circuit of FIG. 3 and the indication of a source of voltage V represent the preferred manner of indicating the function performed by the charged particles present in the fluid stream. The conductor connecting the capacitor "plates" 14 and 16 is actually the body of the band 13. The conductor 19 is the wire illustrated in FIG. 1 and having the same reference number in that figure. Further, FIG. 3 shows the ground connector 20 to be connected to the shielding 23 of a shielded wire which has the wire 19 as its center conductor.

Measuring operations which can advantageously utilize the novel measuring device of the present invention are illustrated in FIG. 4, which shows a pictorial representation of a fluid oscillator and its accompanying inlet and outlets. In this figure some fluid, either liquid or gas, will be introduced at the inlet pipe 41. This fluid will pass through a chamber 43 where it will receive a continuous stream of electrically chargeable particles which will be dispersed throughout the fluid. If these particles are of the type which are spontaneously electrified by the motion of the liquid in the conduit, there is no need for any other charging apparatus. However, these particles might be of any of the well-known types which, while not becoming electrified through friction with the fluid and the conduit walls, will become electrified when subjected to an electric field or to radiation. A source of radiation is shown as the element 45 surrounding the conduit 44. Once having been charged by one of the above-mentioned methods, the electrically charged stream will continue to flow along the conduit 44 until passing the measuring unit 48. When such passage does occur, a voltage will appear on the inner conductor of the shielded wire 48', when the shielding thereof is connected to the outer shield of the measuring device 48. In like manner, the measuring element 49 will produce a voltage indication when the charged particles reach it. The lead 49' is identical to the lead 48' so that it will also provide a voltage between its inner conductor and its shielded outer conductor when a group of charges flows past the measuring element. If the units 48 and 49 are at a fixed, known distance apart, the voltage signals appearing on their respective outputs can be used to indicate the velocity of the fluid moving in the pipe. This can be accomplished through the simple expedient of introducing a small controlled amount of charge carrying particles in the unit 43, or by producing a single pulse of charging energy at the unit 45, or a spaced series of either of these, with the result that a series of voltage pulses will appear between the respective inner conductors and shields of the leads 48' and 49'. The time between the appearance of these pulses at the two measuring elements will then give a direct indication of the velocity of the fluid stream.

Identification of various ones of a group of pulses so impressed can be achieved by controlling the amplitude of the voltage field, or radiation generated at the unit 45, or the spacing between pulses. Thus, any arbitrary waveform can be impressed on a group of chargeable particles by the application of a signal having the desired waveform to the charging source 45.

As has already been noted, the amplitude of the voltage appearing at the center conductor of the output lead of one of the measuring elements is directly proportional to the charge density in the fluid. This property of the measuring device can be used to advantage to enable a single measuring device to provide a voltage which is directly proportional to the rate of flow of fluid in the pipe 44 through the simple expedient of introducing friction-chargeable particles in the unit 43 at a constant rate, with the result that the charge density in the fluid will be inversely proportional to the velocity of fluid flow. Since the voltages appearing on the outputs of the measuring devices, such as 48 and 49, are directly proportional to the charge density in the fluid, the result will be that the voltage produced by one of these measuring devices will be inversely proportional to the fluid flow rate in the conduit. Similarly, this result can be achieved by applying a signal to the device 45 such that it has a constant time-rate of charged particle production. Such a result would be achieved by a source of continuous radiation.

Beyond the measuring element 49 there is shown a fluid control element 46. This element has two outputs and one input and may be, for example, a fluid oscillator, such as that shown in Patent No. 3,016,066, issued on January 9, 1962, to R. W. Warren. The operation of such a device is analogous to that of an electronic oscillator. In such a device the volume of fluid is comparable to the electric current in the electronic oscillator. When a constant flow rate is applied to the input of device 46, the output is divided between the two output conduits 50 and 51, and feedback elements from each of the outputs to respective internal control inputs cause this fluid stream to oscillate between the two outputs at a predetermined rate. The frequency of such oscillation is determined by the dimensions of the fluid oscillator and the velocity with which control signals are fed back from an output conduit to the appropriate control input. The relation between this frequency and the frequency at which a fluid stream can be switched from one output to the other determines the approximate waveform of quantity vs. time for fluid flowing in each of the outputs. Thus, such waveforms can vary between the limits of a series of square wave pulses, representing the condition when switching is relatively rapid, and a series of sinusoidal waves representing the situation when the time required for one-half of a period of oscillation is comparable to the switching time of the device.

Since the quantity of fluid flowing in each output conduit is analogous to the current flow in a comparable electronic circuit, the use of the measuring devices of this invention, such as those shown at 52 and 53, would result in the production of output signals on the leads 52′ or 53′ which would be indicative of the operation and performance of device 46. Such an output would be in the form of a series of pulses or sinusoidal waves.

Further, the device 46 could be a fluid amplifier or a fluid logic circuit, each of which requires additional control inputs (not shown). All of the fluid devices mentioned have the common feature of having a single main input stream and at least two output streams, so that any one of them could be substituted for the element 46 of FIG. 4 without the necessity of altering any of the other elements of that figure. The only additions that would be required would be the insertion of one or more control inputs to the block 46.

It should also be noted that in addition to serving purely as a fluid velocity or fluid volume measuring device, the measuring device of the present invention has great potential utility as a fluid flow-to-voltage converter in situations where it is desirable to combine fluid control devices with electronic devices. Such combinations of devices from these two analogous but diverse fields has almost limitless potential applications.

It will be apparent that the embodiment shown is only exemplary and that various modifications can be made in construction and arrangement within the scope of the invention as defined in the appended claims.

I claim as my invention:
1. A fluid flow device for measuring the rate of flow through an electrically insulating conduit of a fluid having dispersed therein a plurality of electrically charged particles comprising
   (a) a band of electrically conducting material having an inner surface and an outer surface, said band of electrically conducting material completely surrounding said conduit with said inner surface in intimate contact with said conduit and being susceptible to having an electrical charge induced thereon by the passage of an electrically charged particle through said conduit thereby exhibiting the behavior of a first capacitor in series with a source of D.-C. voltage,
   (b) an electrically insulating material completely covering and in intimate contact with the outer surface of said band of electrically conducting material,
   (c) a sheet of electrically conducting material completely surrounding said electrically insulating material and defining the outer boundary thereof and being susceptible to having an electrical charge induced thereon by a charge appearing on the outer surface of said band of electrically conducting material due to a charge having been induced on the inner surface of said band of electrically conducting material thereby exhibiting the behavior of a second capacitor in series with said first capacitor, and
   (d) first and second electrical conductors, said first electrical conductor being electrically connected to said band of conducting material and said second electrical conductor being connected to said sheet of electrically conducting material whereby the instantaneous voltage between said first and second electrical conductors is directly proportional to the charge appearing on said outer surface of said band of electrically conducting material and therefore directly proportional to the charge density in the fluid and inversely proportional to the velocity of fluid flowing in said conduit.
2. A fluid flow device as recited in claim 1 further comprising a resistor electrically connected to said first and second electrical conductors thereby appearing in parallel relationship with said second capacitor, said resistor having a low resistance value whereby the voltage drop across said resistor closely approximates the time derivative of the charge appearing on said outer surface of said band of electrically conducting material.

References Cited by the Examiner
UNITED STATES PATENTS

| | | | |
|---|---|---|---|
| 2,315,805 | 4/43 | Mayo et al. | 73—194 |
| 2,491,445 | 12/49 | Cunningham et al. | 73—194 |
| 2,569,974 | 10/51 | Campbell | 73—194 |
| 2,632,326 | 3/53 | Stuart | 73—194 |

RICHARD C. QUEISSER, *Primary Examiner.*